United States Patent [19]

Töpfl

[11] 4,221,886
[45] Sep. 9, 1980

[54] AGENT FOR SURFACE-SIZING PAPERS WITH MALEIC ANHYDRIDE COPOLYMERS

[75] Inventor: Rosemarie Töpfl, Dornach, Switzerland

[73] Assignee: Ciba-Geigy Aktiengesellschaft, Basel, Switzerland

[21] Appl. No.: 956,512

[22] Filed: Oct. 31, 1978

Related U.S. Application Data

[62] Division of Ser. No. 843,475, Oct. 19, 1977, Pat. No. 4,147,585.

[30] Foreign Application Priority Data

Nov. 1, 1976 [CH] Switzerland ................. 13743/76

[51] Int. Cl.² ..................... C08F 8/32; C08J 3/02
[52] U.S. Cl. ..................... 525/329; 260/29.6 T; 260/29.6 TA; 260/29.6 H; 260/29.6 N; 260/29.6 MN; 260/29.6 PM; 525/379; 526/272

[58] Field of Search ............... 526/15, 272; 260/29.6 T, 29.6 H, 29.6 N, 29.6 PM, 29.6 MN, 29.6 TA; 525/379, 329

[56] References Cited

U.S. PATENT DOCUMENTS

| | | | |
|---|---|---|---|
| 2,615,845 | 10/1952 | Lippincott et al. | 526/15 |
| 2,698,316 | 12/1954 | Giammaria | 526/15 |
| 2,710,283 | 6/1955 | Linsk | 526/15 |
| 2,977,334 | 3/1961 | Zopf et al. | 526/15 |

*Primary Examiner*—John Kight, III
*Attorney, Agent, or Firm*—Sprung, Felfe, Horn, Lynch & Kramer

[57] ABSTRACT

A composition for surface-sizing a paper is provided which contains a water soluble salt of a copolymer of
(a) maleic anhydride and/or maleic acid
(b) styrene
(c) a vinyl alkyl ether, preferably n-butyl-vinyl ether or isobutyl vinyl ether
which has been reacted with
(d) a primary fatty amine such as palmitylamine, oleylamine or preferably stearylamine.

2 Claims, No Drawings

AGENT FOR SURFACE-SIZING PAPERS WITH MALEIC ANHYDRIDE COPOLYMERS

This is a division of application Ser. No. 843,475 filed Oct. 19, 1977, now U.S. Pat. No. 4,147,585.

The subject of the invention is a process for surface-sizing papers with maleic anhydride copolymers, in which the paper is impregnated with water-soluble salts of copolymers of (a) 40 to 50 mol % of maleic anhydride and/or maleic acid, (b) 50 to 40 mol % of styrene and (c) 5 to 15 mol % of vinyl alkyl ethers having 3 to 8 carbon atoms in the alkyl radical, which have been reacted with (d) 0.15 to 0.30 mol per mol of component (a) of a primary fatty amine having 12 to 22 carbon atoms, and dried.

When used in the process according to the invention, copolymers of maleic anhydride are preferred to copolymers of maleic acid or of a mixture of maleic acid and maleic anhydride.

Copolymers of vinyl alkyl ethers having straight-chain or, preferably, branched alkyl radicals are also employed in the process according to the invention. Vinyl alkyl ethers having straight-chain alkyl radicals which can be used are, in particular, methyl vinyl ether, ethyl vinyl ether, n-propyl vinyl ether, n-hexyl vinyl ether and especially n-butyl vinyl ether, and vinyl ethers having branched chain radicals which can be used are isopropyl vinyl ether, in particular 2-ethylhexyl vinyl ether, isohexyl vinyl ether and tert.-butyl vinyl ether and especially isobutyl vinyl ether.

Copolymers of maleic anhydride, styrene and isobutyl vinyl ether or n-butyl vinyl ether are of primary interest.

The copolymers employed in the process according to the invention are always reacted with fatty amines and fatty amines which can be used are not only saturated primary fatty amines, such as myristylamine, arachylamine, behenylamine, in particular laurylamine and palmitylamine and especially stearylamine, but also unsaturated primary fatty amines, such as dodecenylamine, tetradecenylamine, physetoleylamine, elaidinylamine, ricinoleylamine, linoleylamine, linolenylamine and elaeostearylamine and especially oleylamine.

Stearylamine is of particular importance.

In practice, fatty amines which can be used are, in particular, industrial mixtures of saturated and unsaturated, and preferably of saturated and unsaturated, primary fatty amines, especially of those having 16 to 18 carbon atoms. Thus, a copolymer which has been reacted, for example, with an industrial mixture of palmitylamine, stearylamine and oleylamine has proved particularly advantageous when it is employed in the process according to the invention.

The copolymers employed in the process according to the invention are those for which the copolymerisation of the components (a), (b) and (c), and the reaction of the copolymers, thus obtained, with the component (d), can be carried out, preferably in the presence of an inert organic solvent, in suspension or in solution at elevated temperatures of up to 160° C. Possible inert solvents, which are preferably also used, i.e. solvents which are unable to react with the components (a) to (d), are, in particular, those which have a boiling point of 60° to 160° C. Dimethylformamide, tetrahydrofurane, benzene, xylene and, in particular, dioxane and toluene may be mentioned as examples of such solvents. Mixtures of the said solvents can also be used.

The copolymerisation of the components (a), (b) and (c), and the reaction with the component (d), can appropriately be carried out at the reflux temperature of the solvent which is preferably also used, i.e. at 60° to 160° C. and in particular at 100° to 120° C.

In this process, the components (a), (b) and (c) are first polymerised with one another. The relative viscosity or "intrinsic viscosity" K according to Fikentscher (c.f. Cellulosechemie 13[3], 60 (1932)) of the resulting copolymer is 30 to 40. Subsequently, the copolymer thus obtained is reacted with a fatty amine as component (d), if desired as a solution in one of the organic solvents mentioned. The solvents employed in this reaction can appropriately be the same as those employed in the copolymerisation of components (a), (b) and (c). However, it is also possible, when reacting the copolymer of components (a), (b) and (c) with component (d), to use a solvent or solvent mixture which differs from the solvent which was employed in the copolymerisation of components (a), (b) and (c). Likewise, different reaction temperatures can be chosen.

The reaction products thus obtained are precipitated from the reaction mixture, if necessary by adding non-polar solvents, for example aliphatic saturated hydrocarbons, and thus separated off.

The reaction products can then be converted to water-soluble salts by dissolving them in a suitable base. Examples which may be mentioned of bases which are suitable for this purpose are alkali metal hydroxides, such as potassium hydroxide and especially sodium hydroxide, and as a rule these can be employed in the form of aqueous solutions. Further preferred bases are alkylamines, i.e. mono-, di- and tri-alkylamines, and tetraalkyl-ammonium salts, in particular tetraalkyl-ammonium hydroxides, having 1 to 6, and preferably 1 or 2, carbon atoms in the alkyl radical, and especially ammonia, which can be employed as a gas or, preferably, in the form of an aqueous solution. The amount of the bases mentioned can be so regulated that the pH value of an approximately 10% strength by weight aqueous solution of the copolymer salts is 7.5 to 12 and preferably 9 to 10.

As a rule, the resulting copolymer salts are in the form of stable, clear aqueous solution, the copolymer salt content of which is 5 to 40, preferably 5 to 15 and especially 5 to 10 percent by weight. The copolymer salts, which can be in the form of aqueous solutions, as agents for carrying out the process according to the invention, and the use of the copolymer salts for surface-sizing of paper are also subjects of the invention.

Before they are used in the process according to the invention, the water-soluble copolymer salts are diluted to give an aqueous impregnating liquor with a salt content of 0.01 to 0.1 percent by weight. In the process according to the invention, the impregnating liquor is applied to the paper, for example by spraying and preferably by padding, as a rule at room temperature. The impregnated paper is then dried at 100° to 140° C. and preferably at 100° to 120° C., for 15 to 60, and preferably 20 to 40, minutes.

After drying, a paper is obtained which has a coating of copolymer salts per unit area of 70 to 150, and preferably 120 to 130 mg/m$^2$.

Papers which are paper to be sized according to the invention are papers of any desired type having any desired weights per unit area, for example papers and cardboards of bleached and non-bleached sulphite-cellulose or sulphate-cellulose. A further subject of the invention relates to the paper having a sized surface which has been treated by the process according to the invention.

The process according to the invention has the essential advantage that particularly good sizing effects are achieved even when small amounts of copolymers salts per unit area are applied to the paper; these effects are confirmed on the basis of positive test results, such as in the alkali drop test, for the ink floating time and from the determination of the absorption of water according to Cobb. In addition, the copolymer salts used according to the invention have good compatability with the conventional auxiliaries used in the paper industry, such as optical brighteners, dyes, pigments, binders and other additives.

In the preparation instructions and application examples which follow, the percentages given are percentages by weight.

PREPARATION INSTRUCTIONS

A. 44.2 g (0.45 mol) Of maleic anhydride, 46.8 g (0.45 mol) of styrene and 10 g (0.1 mol) of isobutyl vinyl ether are dissolved in 235 g of toluene.

25% of this solution are warmed to 80° C. in an inert nitrogen atmosphere and a catalyst solution consisting of 0.18 g of benzoyl peroxide in 2 g of toluene is added. The temperature rises to 90° C. and the polymer starts to precipitate out. The remaining 75% of the monomer solution and a catalyst solution consisting of 1.62 g of benzoyl peroxide in 19.2 g of toluene are now added dropwise at the same time from 2 separate dropping funnels in the course of 2 hours. Subsequently, the reaction mixture is kept at 85° C. for 3 hours in order to bring the polymerisation reaction to completion. The polymer which has precipitated is filtered off and dried.

Yield: 96 g=95.1% of theory.

The Fikentscher K value is 34.7.

22.4 g of the polymer salt described above, together with 6.58 g (0.025 mol, corresponding to 0.25 mol per mol of maleic anhydride employed) of a mixture of fatty amines consisting of palmitylamine, stearylamine and oleylamine (average molecular weight 263) in 68 g of dioxane, are kept at the reflux temperature of 100° C. for 24 hours.

The solution is then cooled to room temperature and the product is precipitated from petroleum ether.

After drying, 27.5 g=95.0% of theory of a yellowish powder are obtained.

10 g of the dried reaction product are dissolved, at 70° C., in 86 g of deionised water, which contains 4 g of a 24% strength aqueous solution of ammonia. A clear, storable solution is obtained which has a pH value of 9.2 and which contains 10% of the ammonium salt of the copolymer reacted.

B. The procedure is as indicated in Instructions A, but 6.75 g (0.025 mol) of stearylamine are employed.

C. 41.7 g (0.425 mol) of maleic anhydride, 44.2 g (0.425 mol) of styrene and 15.0 g (0.15 mol) of n-butyl vinyl ether are dissolved in 235 g of toluene.

25% of this solution are warmed to 80° C. in an inert nitrogen atmosphere and a catalyst solution consisting of 0.18 g of benzoyl peroxide in 2 g of toluene is added. The temperature rises to 83° C. and the polymer starts to precipitate out. The remaining 75% of the monomer solution and a catalyst solution consisting of 1.62 g of benzoyl peroxide in 19.2 g of toluene are now added dropwise at the same time from two separate dropping funnels in the course of 2 hours. Subsequently, the reaction mixture is kept at 85° C. for 3 hours in order to bring the polymerisation reaction to completion. The polymer which has precipitated is filtered off and dried.

Yield: 92.7 g=92% of theory.

The Fikentscher K value is 32.4.

23.75 g of the polymer described above, together with 6.58 g (0.025 mol, corresponding to 0.25 mol per mol of maleic anhydride employed) of a mixture of fatty amines consisting of palmitylamine, stearylamine and oleylamine (average molecular weight 263) in 72 g of dioxane, are kept at the reflux temperature of 100° C. for 24 hours.

The solution is then cooled to room temperature and the product is precipitated from petroleum ether.

After drying, 27 g=89% of theory of a yellowish powder are obtained.

7.5 g of the dried reaction product are dissolved, at 70° C., in 139.5 g of deionised water which contains 3 g of a 24% strength aqueous solution of ammonia. A clear, storable solution is obtained which has a pH value of 9.6 and which contains 5% of the ammonium salt of the copolymer reacted.

D. 46.6 g (0.475 mol) of maleic anhydride, 49.4 g (0.475 mol) of styrene and 5 g (0.05 mol) of n-butyl vinyl ether are dissolved in 235 g of toluene.

25% of this solution are warmed to 80° C. in an inert nitrogen atmosphere and a catalyst solution consisting of 0.18 g of benzoyl peroxide in 2 g of toluene is added. The temperature rises to 82° C. and the polymer starts to precipitate out. The remaining 75% of the monomer solution and a catalyst solution consisting of 1.62 g of benzoyl peroxide in 19.2 g of toluene are now added dropwise at the same time from 2 separate dropping funnels in the course of 2 hours. Subsequently, the reaction mixture is kept at 85° C. for 3 hours. The polymer which has precipitated out is filtered off and dried.

Yield: 97 g=96% of theory.

The Fikentscher K value is 32.4.

21.3 g of the polymer described above, together with 6.75 g (0.025 mol, corresponding to 0.25 mol per mol of maleic anhydride employed) of stearylamine in 66 g of dioxane, are kept at the reflux temperature of 100° C. for 24 hours. The solution is then cooled to room temperature, and the product is precipitated from petroleum ether. After drying, 25.8 g=92% of theory of a yellowish powder are obtained.

7.5 g of the dried reaction product are dissolved, at 70° C., in 138.5 g of deionised water which contains 4 g of a 24% strength aqueous solution of ammonia.

A clear, storable solution is obtained which has a pH value of 10 and which contains 5% of the ammonium salt of the copolymer reacted.

EXAMPLE 1

A filter paper made of pure cellulose and having a weight per unit area of 140 g/m$^2$ is padded at a speed of 4 m/minute and under an applied pressure of 10 kg/cm$^2$ with an aqueous liquor which, as a result of diluting the solution obtained according to Preparation Instructions A with water, contains 0.067% of the ammonium salt of the copolymer reacted. The padded paper is dried for 30 minutes at 120°–125° C.

The resulting surface-sizing of the paper treated in this way is assessed by the following tests:

Absorption of water according to Cobb for a period of action of 30 seconds (AW Cobb$_{30}$) according to DIN 53,132.

The lower the absorption of water, the better is the surface-sizing of the treated paper.

*Ink floating time* (IFT) using test ink according to DIN 53,126.

Paper blue test ink according to DIN 53,126 is poured into a 10×12 cm porcelain dish until it reaches a level of 0.5 cm. The paper to be tested is folded into small boats with a raised edge (size 4×4 cm). The small boats are placed on the surface of the ink using tweezers. At the same time, a stopwatch is started, and the time which elapses before the test ink visibly soaks through is measured.

In the case of untreated paper the test ink soaks through immediately. The longer the time needed for the test ink to soak through the sized paper, the better is the sizing.

Alkaline drop test (ADT)

1 drop of an aqueous 1.0 N sodium hydroxide solution is allowed to fall from a 1 ml pipette from a height of 5 cm onto the paper to be tested, which is held horizontal. At the same time, a stopwatch is started.

The time interval which is required for the paper to absorb the drop is now measured. The end point is reached when the gloss disappears. The result is given in seconds to the nearest 10 second interval.

Unsized paper absorbs the drop of alkali immediately, whilst sized paper absorbs the drop of alkali at a rate which is slower the better the sizing effect.

The test results for the paper treated according to the invention and for the untreated paper are summarised in Table I which follows, the figures given being the average of 4 measurements in the case of AW $Cobb_{30}$ and of 2 measurements in the case of the IFT and ADT.

Table I

| Treated paper, dry coating mg/m² | Test results | | |
|---|---|---|---|
| | AW $Cobb_{30}$ g/m² | IFT seconds | ADT seconds |
| 71 | 49 | 100 | 333 |
| 91 | 26 | 325 | 580 |
| 112 | 21 | 1,075 | 860 |
| 137 | 20 | 1,500 | 1,120 |
| Untreated paper | 100 | 1 | 1 |

Similar results are obtained when a solution is employed which contains the ammonium salts of the copolymer reacted in accordance with Preparation Instructions B.

EXAMPLE 2

The procedure is as described in Example 1, but the filter paper is padded with aqueous liquors which, as a result of diluting the solutions obtained according to Preparation Instructions C and D with water, contain 0.067% of the ammonium salt of the corresponding copolymer reacted. The padded paper is dried at a speed of 4 m/minute on a drum which has a surface temperature of 100° C.

The resulting surface-sizing of the paper treated in this way is assessed using the tests indicated in Example 1.

The results of these tests are summarised in Table II which follows.

Table II

| Dry coating mg/m² | Test results | | |
|---|---|---|---|
| | AW $Cobb_{30}$ g/m²* | IFT seconds** | ADT seconds** |
| Paper treated with the salt according to Instructions C: | | | |
| 69 | 48 | 95 | 250 |
| 91 | 30 | 190 | 440 |
| 114 | 23 | 450 | 620 |
| 141 | 19 | 1,100 | 890 |
| Paper treated with the salt according to Instructions D | | | |
| 70 | 51 | 100 | 380 |
| 94 | 39 | 450 | 470 |
| 115 | 24 | 750 | 490 |
| 140 | 20 | 990 | 570 |
| Untreated paper | | | |
| — | 100 | 1 | 1 |

*Average of 4 measurements
**Average of 2 measurements

What is claimed is:

1. A composition for surface size of paper with maleic anhydride copolymer, which contains a water-soluble salt of a copolymer of (a) 40 to 50 mol % maleic anhydride and/or maleic acid, (b) 50 to 40 mol % of styrene and (c) 5 to 15 mol % of a vinyl alkyl ether having 3 to 8 carbon atoms in the alkyl radical, which has been reacted with (d) 0.15 to 0.30 mol per mol of component (a) of a primary fatty amine having 12 to 22 carbon atoms.

2. A composition according to claim 1, which is in the form of an aqueous solution.

* * * * *